3,179,556
METHOD OF CONTROLLING FUNGI BY MEANS OF AN ORGANIC DISULFIDE
Thomas B. Williamson, Santa Clara, Calif., and Karoly Szabo, Yonkers, N.Y., assignors to Stauffer Chemical Company, New York, N.Y., a corporation of Delaware
No Drawing. Filed Jan. 25, 1962, Ser. No. 168,811
1 Claim. (Cl. 167—22)

This invention is concerned with a method of controlling the growth of microorganisms particularly those which are classified as fungi and bacteria by means of hexachlorodimethyldisulfide. The invention also pertains to the formulation, use and application of microbiocides incorporating, as their active constituent, the aforementioned hexachlorodimethyldisulfide.

In accordance with the present invention, it has been discovered that microorganisms of the type exemplified by fungi and bacteria are extremely sensitive to hexachlorodimethyldisulfide and the use of even minute concentrations of this substance has been found to be effective in controlling the growth of the aforementioned microorganisms. Because the toxicity of the hexachlorodimethyldisulfide is manifest at very low concentrations, its incorporation in suitable microbiocidal compositions is facilitated since it is easier to formulate such biocidal compositions when the active component constitutes only a small fraction of the whole. This holds true whether the active entity is dissolved directly in an organic solvent or whether it is dispersed in an aqueous media in the presence of a surface active agent.

In preparing microbiocidal compositions for use as contemplated herein, any number of procedures may be resorted to which are known in the art. Generally, the toxicant is applied in the form of a free-flowing powder or as a liquid, the latter being, as has previously been pointed out, a solution of the compound in a solvent or a suspension or dispersion in an aqueous media.

If it is desired to employ a solid composition, the active entity is mixed with a suitable inert powder and, in this connection, reference is made to various natural clays such as kaolinite clay, diatomaceous earth, talc or any of the synthetic mineral fillers of which synthetic fine silica or synthetic calcium or magnesium silicate are typical; organic extenders such as wood flour, walnut shell flour, soya bean flour, etc.

Although the ratio of extender to active entity is not critical, the high degree of potency exhibited by the hexachlorodimethyldisulfide makes it unnecessary to resort to formulations wherein this active entity constitutes more than a few percent of the total composition.

The procedures whereby liquid formulations are prepared, using the active component of the invention, are likewise described in the prior art. Generally speaking, the toxicant is dissolved in an organic solvent such as acetone, Stoddard solvent, ligroin or any of the commercially available chlorinated hydrocarbon or ester solvents and the resulting solutions sprayed or otherwise applied to the microorganisms, the growth of which it is desired to control. Dispersions may likewise be used and these are conveniently prepared by dispersing the toxicant of the invention in water in the presence of a surface active agent as exemplified by Methocel (methyl cellulose), gum arabic, polyvinyl alcohol and related materials.

The following tests and procedures were carried out using the toxicant of the invention.

In vitro tests were conducted in order to measure the fungitoxicity when the hexachlorodimethyldisulfide was placed in contact with growing fungus or bacteria. In this procedure, 1 oz. bottles are partially filled with 10 ml. of malt or nutrient broth and capped with aluminum foil, sterilized and maintained for the test. A compound is then injected by means of a syringe through the foil and into the broth followed by inoculation with a water suspension of spores. The bottles are sealed and held for one week before the results are evaluated.

Another type of in vitro test is the agar plate fumigation test, the purpose of which is to determine whether the vapor of the compound is fungicidal. The procedure comprises placing approximately 0.1 gram of the toxicant in a 0.5 ml. micro beaker which is then located in a petri dish of hardened potato dextrose agar. The spores of the microorganisms which are used in testing are dusted over the agar surface and, after one week, the growth of fungus is observed and recorded.

A foliage fungicide test was also conducted, the purpose of which was to ascertain the protectant action of the test compound. Pinto bean plants were sprayed with various concentrations of the toxicants and, after drying, the plants were inoculated with bean rust or powdery mildew spores. In the case of rust infection, an overnight treatment in a moisture chamber is carried out after the inoculation of the plants. Comparisons were made with untreated plants and the results evaluated.

A soil fungicide test was carried out in order to test the effectiveness of a toxicant of the invention against such typical plant pathogens as *Rhizoctonia* and *Fusarium solani*. Each of the pathogens is mixed with sterilized soil and 1 lb. portions thereof added to quart jars. A small depression is then formed in the soil and this is filled with coarse sand. 1 ml. of a 5% acetone solution of the compound is placed on the sand, the jar sealed and the contents thoroughly shaken in order to mix the compound throughout the soil. The treated soil is next placed in a paper container and seeded with cotton or pinto beans. Cotton infection is observed after a period of 2 or 3 weeks and the beans examined for infection after a period of 3 and 4 weeks.

The results of carrying out the above described tests using hexachlorodimethyldisulfide of this invention are reported in the table below.

*In vitro tests*

| Sealed vial: | Minimum inhibitory concentration (p.p.m.) |
|---|---|
| *Aspergillus niger* | (0.5) |
| *Botrytis cinerea* | (0.5) |
| *Stemphylium sp.* | (1) |
| Agar plate: | |
| *Escherichia coli* | 25 |
| *Erwinia amylovora* | 50 |
| *Staphylococcus aureus* | 50 |

Agar fumigation with *A. niger* = 100% control.

*Foliage fungicide tests*

| Protectant | Percent control | | |
|---|---|---|---|
| | 1,000 p.p.m. | 500 p.p.m. | 100 p.p.m. |
| Pinto bean rust | 90 | 35 | 35 |
| Pinto bean powdery mildew | 35 | 0 | 0 |
| Northern corn leaf blight | 0 | 0 | 0 |

*Soil fungicide tests*

| | Minimum inhibitory concentration (p.p.m.) |
|---|---|
| *Rhizoctonia solani* | *(27) |
| *Fusarium solani* | *13 |

*=lowest concentration tested.
( )=partial control at indicated concentration (p.p.m.).

Hexachlorodimethyldisulfide is a known compound and is described in the technical literature. It is commonly prepared by the reaction of 2 moles of perchloromethyl mercaptan and 1 mole of silver. However, the method is generally unsatisfactory because of low yields and formation of by-products. We have discovered a new method of preparing hexachlorodimethyldisulfide and the provision of this method constitutes an added and beneficial feature of this invention. The aforesaid method is predicated on the discovery that hexachlorodimethyldisulfide can be obtained by the reaction of perchloromethyl mercaptan with a phenolic halogen acceptor in the presence of anhydrous aluminum chloride as a catalyst. Phenolic halogen acceptors which are eminently suitable in carrying out the aforedescribed reaction are the so-called acidic phenols, i.e. those phenols having electronegative or electron attracting substituents attached to the aromatic ring. Typical acidic phenols contain halogen and nitro substituents affixed to the ring and, in this connection, mention is made of o-nitrophenol, 2,4-dichlorophenol, 3,4-dichlorophenol and the like.

In general, excellent yields are realized when the reaction is carried out in a relatively inert organic solvent using approximately molar proportions of perchloromethyl mercaptan and the acidic phenolic halogen acceptor. The quantity of anhydrous aluminum chloride can be varied over a considerable range since the amount of the catalyst is not critical. In some instances, the aluminum chloride apparently forms complexes with the reactants in which case it may be desirable to employ at least a molar proportion of the catalyst. At other times, less than molar proportions of aluminum chloride are entirely satisfactory for producing opimum yields of product. The following example illustrates the above described method in greater detail:

23 g. of o-nitrophenol, 81 ml. of 2-nitropropane and 26.6 g. of anhydrous aluminum chloride were mixed while using an outside cooling source to keep the mixture near room temperature. After the components were thoroughly mixed, the temperature was raised to 85° C. and 30.8 g. of perchloromethyl mercaptan added over a period of 25 minutes while maintaining the temperature between 80–90° C. The mixture was heated an additional 5 minutes at 90° C. and, after cooling to room temperature, poured into a mixture of ice and hydrochloric acid. The organic layer was separated and the aqueous phase extracted with 50 ml. of hexane. The organic components were combined and the volatile components removed by distillation, leaving a residue amounting to 44.1 grams. The crude product was further purified by treating with a 10% sodium hydroxide solution, after which the organic portion was further purified by triturating with hexane which dissolved the disulfide but not the tarry by-products of the reaction. The product was finally isolated by evaporating the hexane solvent which left a yellow oil, having a refractive index of 1.5932.

We claim:

A method of inhibiting the growth of microorganisms which comprises applying thereto a small but effective amount of hexachlorodimethyldisulfide.

References Cited by the Examiner
UNITED STATES PATENTS

| 2,451,411 | 10/48 | Raasch | 167—22 |
| 2,553,777 | 5/51 | Hawley et al. | 167—22 |
| 2,560,421 | 7/51 | Eby | 167—22 |
| 2,723,910 | 11/55 | Goodhue et al. | 167—22 |
| 2,825,744 | 3/58 | Tor Halfdan | 260—607 |
| 2,825,745 | 3/58 | Tor Halfdan | 260—607 |
| 3,034,949 | 5/62 | Ryker | 167—22 |
| 3,038,014 | 6/62 | Geering | 167—22 |
| 3,046,189 | 7/62 | Jacobi et al. | 167—22 |

FOREIGN PATENTS

| 249,830 | 2/26 | Great Britain. |

OTHER REFERENCES

Chem. Abs., vol. 51, p. 1844OC (1956).
Chem. Abs., vol. 50, p. 5442i (1955), and vol. 54, p. 2152h (1959).

LEWIS GOTTS, *Primary Examiner.*

MORRIS O. WOLK, JULIAN S. LEVITT, *Examiners.*